United States Patent Office 3,547,597
Patented Dec. 15, 1970

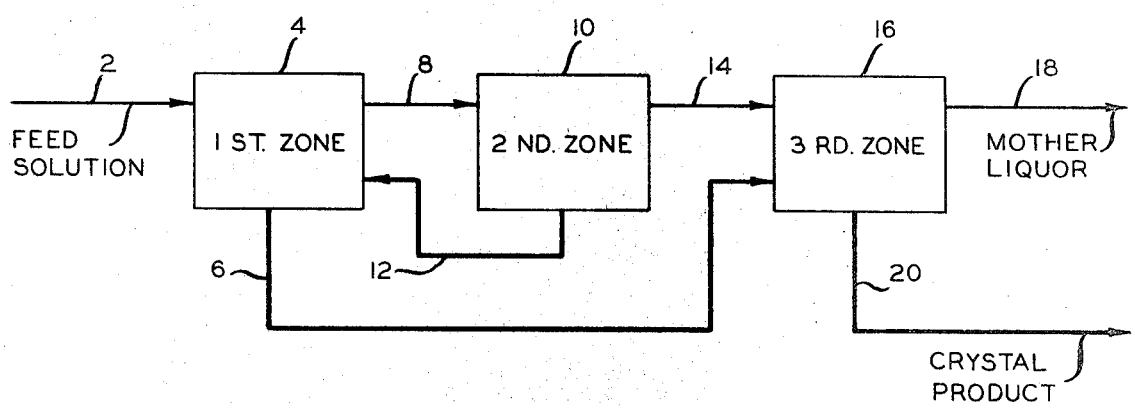

3,547,597
METHOD FOR PRODUCING HIGH-PURITY CRYSTALS USING SERIALLY CONNECTED CRYSTALLIZATION ZONES
George E. Hays, Bartlesville, Okla., assignor to Phillips Petroleum Company, a corporation of Delaware
Filed May 22, 1967, Ser. No. 640,007
Int. Cl. B01d 9/02; C01d 7/00; C07d 55/52
U.S. Cl. 23—302
4 Claims

ABSTRACT OF THE DISCLOSURE

Production of high-purity crystals, for example, sodium carbonate or hexamethylene tetramine, by passing a liquid solution of the crystallizable material through a series of crystallization zones, removing crystals from an intermediate crystallization zone and passing the intermediate zone crystals to a crystallization zone upstream from the intermediate crystallization zone. Crystals from the upstream crystallization zone can be removed and passed to a crystallization zone downstream from the intermediate crystallization zone.

---

In many industrial applications, chemical compounds are separated by means of crystallization where separation by distillation is impracticable or impossible. Separation by crystallization is very advantageous when dealing with materials which have relatively high boiling ranges or with substances which are thermally unstable, or with solutions containing both volatile and nonvolatile impurities or undesired constituents.

One continuous fractional crystallization process employs a plurality of crystallization zones wherein the liquid or mother liquor moves countercurrent to the flow of crystals. The mother liquor passes from a zone of higher temperature to a zone of lower temperature.

It has recently been found by Denbigh and White, Chemical Engineering Science, 1966, vol. 21, pp. 739–754, that in hexamethylene tetramine crystals which are crystallized from an aqueous solution that impurities are occluded on the crystals when the crystals are in an intermediate critical size range above about 65 microns.

I have now found that crystal purity can be maximized by employing a continuous crystallization process in which crystals in the critical size range, in which impurities are most likely to be occluded, are contacted under crystallizing conditions with a solution containing the crystallizable material with the least concentration of impurities. The crystal product from this crystallization zone, having grown past the critical crystal size range, can then be passed through other crystallization zones in which the concentration of impurities is greater than the former zone.

By various aspects of this invention one or more of the following or other objects can be obtained.

It is an object of this invention to provide a process for crystallization of a crystallizable material from a solution whereby a minimum of impurities are occluded on the growing crystals.

It is a further object of this invention to provide a process for separating a crystallizable material from a solution containing the same wherein the crystals so formed are continuously grown by contacting the crystals with a solution containing different concentrations of impurities.

It is a still further object of this invention to provide a process for the purification of sodium carbonate from Trona ore.

Other aspects, objects and the several advantages of this invention are apparent to one skilled in the art from a study of this disclosure, the drawings, and the appended claims.

According to the invention, high-purity crystals are produced from a liquid solution containing crystallizable material by passing the liquid solution containing the crystallizable material serially through a plurality of crystallization zones, removing mother liquor product and a crystal product from each of the crystallization zones and passing the crystals from an intermediate crystallization zone to an upstream crystallization zone. The crystals removed from the intermediate crystallization zone will have approached a critical size where maximum occlusion of impurities will occur with additional growth. The upstream crystallization zone contains a maximum amount of crystallizable material and a minimum amount of impurities relative to the liquid in the crystallization zones. The crystals removed from the first crystallization zone or the upstream crystallization zone can be passed through a crystallization zone downstream from the intermediate crystallization zone.

In a specific embodiment of the invention, Trona ore is calcined for conversion to crude sodium carbonate. This product is dissolved in water and/or recycle mother liquor and the insoluble material removed therefrom by filtration. The filtrate is passed to a series of crystallizers wherein sodium carbonate monohydrate crystals are precipitated by cooling and/or evaporation. This general process is described in Seglin et al., U.S. 2,962,348. In order to minimize the impurities on the sodium carbonate crystals, the crystals are first formed and grown to a critical size in an intermediate zone and then passed to an upstream zone for additional growth in the critical range where the concentration of impurities in the solution is the least.

In another specific embodiment of the invention, the solution is an aqueous solution of hexamethylene tetramine and the crystals produced by the process are hexamethylene tetramine. The crystal size of the crystals removed from the intermediate zone is less than about 65 microns.

The invention will now be described with reference to the accompanying drawing which shows a specific example of this invention as applied to the crystallization of sodium carbonate from an aqueous solution.

Referring now to the drawing, an aqueous solution of sodium carbonate is passed through line 2 to a first crystallization zone 4. In the first crystallization zone the temperature will be in the range of 150° F. to 190° F. and at a pressure in the range of 3.2 to 7.9 p.s.i.a. Crystals are removed through line 6 and mother liquor is removed through line 8 and passed to a second crystallization zone 10. In this second crystallization zone 10, the temperature will be in the range of 190° F. to 230° F. at a pressure in the range of 7.9 to 17.6 p.s.i.a., and will produce crystals which are removed through line 12 and mother liquor which is removed through line 14 which is then passed to a third crystallization zone 16. In the third crystallization zone 16 the temperature will be in the range of 105° F. to 150° F., a temperature which is sufficient to crystallize a substantial percentage of the sodium carbonate as monohydrate crystals from solution without the formation of excessive impurities in the sodium carbonate crystals. The vapor pressure in the third crystallization zone is in the range of 0.9 to 3.2 p.s.i.a. The spent mother liquor containing the impurities is removed through line 18 and the sodium carbonate monohydrate crystals are removed through line 20.

According to the invention, the crystals removed through line 12 from the intermediate crystallization zone 10 are passed to the first crystallization zone 4. The crystals removed through line 12 will approach the critical size above which a maximum amount of impurities are likely to occlude. In the first crystallization zone 4 the concentration of impurities will be the lowest and, therefore, less impurity to be occluded by the crystals growing through the critical size. Thus, the growth conditions in the first crystallization zone should produce a minimum amount of impurities in the crystals during the critical growth. The crystals removed through line 6 will generally be above the critical size where less occlusion occurs upon further growth and are passed to the downstream crystallization zone 16 at which the final growing takes place. In this downstream crystallization zone 16 the concentration of impurities in the mother liquor will be the greatest but occlusion is reduced. However, at this point it is not significant that the solution contain a substantial amount of impurities since the crystals are less likely to occlude these impurities at this size.

In the description of the invention, it is preferred that the initial crystals be grown in an intermediate crystallization zone. However, it is within the scope of the invention to initially grow the crystals in the downstream crystallization zone such as 16 so long as the crystals when they reach the critical size are passed to the upstream crystallization zone 4.

Whereas the invention has been described with reference to the crystallization of sodium carbonate from solution, the invention can be applied to the crystallization of any material whether organic or inorganic. Organic systems include the crystallization of p-xylene from mixed xylenes, cyclohexane from admixture with similar boiling hydrocarbons, benzene from a benzene-n-hexane mixture, separation of chloronitrobenzene isomers, etc. The process can also be used for crystallization of ice crystals of increased purity from sea water. Other inorganic examples include ammonium sulfate, sodium bicarbonate, sodium sulfate, sodium chlorate, potassium chloride, etc.

Reasonable variation and modification are possible within the scope of the foregoing disclosure, the drawing, and the appended claims without departing from the spirit of the invention.

What is claimed is:

1. A process for the production of high-purity crystals from a liquid solution containing crystallizable material characterized by crystals of that material which, below a certain sizes, have a smaller ratio of occluded impurities than larger crystals comprising passing said liquid solution containing said crystallizable material serially through a plurality of crystallization zones, in each of said crystallization zones removing a mother liquor product and a crystal product, growing crystals to a predetermined size in an intermediate second crystallization zone; passing crystals from the second crystallization zone to an upstream first crystallization zone where the concentration of impurities in the liquor is the lowest relative to other crystallization zones, said crystals removed from the second zone being of a size below that at which the maximum amount of impurities will be occluded onto said crystals; growing to a larger size in said first zone the crystals passed from the second zone to the first zone; and passing crystals directly from the first zone to a third crystallization zone positioned downstream of the second crystallization zone.

2. A process according to claim 1 wherein said third crystallization zone contains the largest percentage of impurities.

3. A process for the production of high-purity crystals from an aqueous solution of hexamethylene tetramine comprising passing said aqueous solution serially through a plurality of crystallization zones, in each of said crystallization zones removing a mother liquor product and a crystal product, passing crystals of hexamethylene tetramine from an intermediate crystallization zone to an upstream crystallization zone, the size of the crystals removed from the intermediate crystallization zone being less than about 65 microns and just below that size at which the maximum amount of impurities will be occluded onto said crystals.

4. A process for the production of high-purity crystals from an aqueous solution of sodium carbonate comprising passing said aqueous solution serially through a plurality of crystallization zones, in each of said crystallization zones removing a mother liquor product and a crystal product, passing crystals from an intermediate crystallization zone having a temperature in the range of about 190° to 230° F. and a pressure in the range of about 7.9 to 17.6 p.s.i.a. to an upstream crystallization zone having a temperature in the range of about 150° to 190° F. and a pressure in the range of about 3.2 to 7.9 p.s.i.a., the size of the crystals removed from the intermediate crystallization zone being just below that size at which the maximum amount of impurities will be occluded onto said crystals.

References Cited

UNITED STATES PATENTS

| | | | |
|---|---|---|---|
| 1,635,707 | 7/1927 | Carter | 260—248.6 |
| 1,907,987 | 5/1933 | Lynn | 23—302X |
| 2,389,732 | 11/1945 | Kellogg | 62—58X |
| 2,552,524 | 5/1951 | Cunningham | 62—124 |
| 2,962,348 | 11/1960 | Seglin et al. | 23—302X |
| 3,019,611 | 2/1962 | Toulmin | 62—58 |

NORMAN YUDKOFF, Primary Examiner

R. T. FOSTER, Assistant Examiner

U.S. Cl. X.R.

23—301; 260—248.6, 707